US012804333B2

(12) United States Patent
Plinzler et al.

(10) Patent No.: US 12,804,333 B2
(45) Date of Patent: Nov. 17, 2026

(54) METHOD FOR ASCERTAINING THE WEARING AS INTENDED OF A BINAURAL HEARING SYSTEM, AND BINAURAL HEARING SYSTEM

(71) Applicants: Sivantos Pte. Ltd., Singapore (SG); Widex A/S, Lynge (DK)

(72) Inventors: Jens Plinzler, Erlangen (DE); David Gröblbauer, Lynge (DK)

(73) Assignees: Sivantos Pte. Ltd., Singapore (SG); Widex A/S, Lynge (DK)

( * ) Notice: Subject to any disclaimer, the term of this patent is extended or adjusted under 35 U.S.C. 154(b) by 158 days.

(21) Appl. No.: 18/958,171

(22) Filed: Nov. 25, 2024

(65) Prior Publication Data

US 2025/0175748 A1 May 29, 2025

(30) Foreign Application Priority Data

Nov. 23, 2023 (DE) ..................... 10 2023 211 689.8

(51) Int. Cl.
*H04R 25/00* (2006.01)

(52) U.S. Cl.
CPC .................................... *H04R 25/50* (2013.01)

(58) Field of Classification Search
CPC .. H04R 2225/61; H04R 25/50; H04R 25/552; H04R 1/1041; H04S 7/302; H04S 7/303; H04S 7/304
See application file for complete search history.

(56) References Cited

U.S. PATENT DOCUMENTS

| | | | | |
|---|---|---|---|---|
| 8,130,990 | B2 | 3/2012 | Reithinger | |
| 10,524,063 | B2 | 12/2019 | Pedersen et al. | |
| 2011/0260923 | A1 | 10/2011 | Liao et al. | |
| 2013/0279724 | A1* | 10/2013 | Stafford | H04R 1/1041 381/74 |
| 2018/0152795 | A1* | 5/2018 | Lee | H04R 1/1041 |

FOREIGN PATENT DOCUMENTS

| | | | |
|---|---|---|---|
| DE | 102007046437 | A1 | 4/2009 |
| EP | 3890344 | A1 | 10/2021 |

* cited by examiner

*Primary Examiner* — Kile O Blair
(74) *Attorney, Agent, or Firm* — Laurence A. Greenberg; Werner H. Stemer; Ralph E. Locher

(57) ABSTRACT

A method for ascertaining the wearing as intended of a binaural hearing system having a first hearing instrument and a second hearing instrument, includes capturing a first motion signal by using a first motion sensor of the first hearing instrument, and capturing a second motion signal by using a second motion sensor of the second hearing instrument, and/or estimating or ascertaining a distance between the first hearing instrument and the second hearing instrument by using a communication system of the two hearing instruments. It is identified, based on the first motion signal and the second motion signal and/or based on the ascertained distance, whether the two hearing instruments are each being worn in their intended position on respective ears of a user. A binaural hearing system is also provided.

12 Claims, 3 Drawing Sheets

METHOD FOR ASCERTAINING THE WEARING AS INTENDED OF A BINAURAL HEARING SYSTEM, AND BINAURAL HEARING SYSTEM

CROSS-REFERENCE TO RELATED APPLICATION

This application claims the priority, under 35 U.S.C. § 119, of German Patent Application DE 10 2023 211 689.8, filed Nov. 23, 2023; the prior application is herewith incorporated by reference in its entirety.

FIELD AND BACKGROUND OF THE INVENTION

The invention relates to a method for ascertaining the wearing as intended of a binaural hearing system having a first hearing instrument and a second hearing instrument. The invention also relates to a binaural hearing system.

For hearing instruments in general, i.e. devices having an electro-acoustic sound transducer for producing an output sound from an electrical audio signal, and for hearing aids in particular, i.e. hearing instruments intended and appropriately configured to treat a hearing impairment of a wearer, it can be of interest to detect the wearing of a hearing instrument.

Whereas most hearing instruments have a hardware switch on the housing, which can be used to switch the hearing instrument on and off, possibly in addition to other functions assigned to the switch, whereby the power drain from a battery of the hearing instrument concerned can be suspended completely, the provision of individual functions of the hearing instrument can be linked to the wearing of same. That can be the case in particular if the hearing instrument is put into a type of standby mode when not in use, and hence not being worn as stipulated by requirements, so as to reduce the power consumption significantly by disabling most of the functions, yet is still ready to resume full operation immediately (including the temporarily disabled functions). As a result, the hearing instrument does not have to be restarted first (including loading the firmware, etc.), which could lead to a time delay for the user, i.e. the wearer.

Such a standby operating mode can be of interest in particular for hearing aids in the narrower sense (i.e. the hearing instruments intended to treat a hearing impairment), because firstly the range of functions during the intended operation of the hearing aid can include a large number of signal processing processes, some of which are computationally intensive and hence power intensive, which are preferably meant to be deactivated when the hearing aid is temporarily removed. Secondly, the full range of functions should be available again as soon as possible when the hearing aid is refitted. In addition, if the correct wearing is identified, signal amplification can also be reduced because it can be assumed that an output sound produced is fed optimally to the designated eardrum. Moreover, that can reduce the risk of feedback occurring.

SUMMARY OF THE INVENTION

It is accordingly an object of the invention to provide a method for ascertaining the wearing as intended of a binaural hearing system, and a binaural hearing system, which overcome the hereinafore-mentioned disadvantages of the heretofore-known methods and systems of this general type and which detect in the simplest possible manner the wearing as intended, and in particular the correct wearing, of hearing instruments.

With the foregoing and other objects in view there is provided, in accordance with the invention, a method for ascertaining the wearing as intended of a binaural hearing system having a first hearing instrument and a second hearing instrument, wherein a first motion signal is captured by a first motion sensor of the first hearing instrument, and a second motion signal is captured by a second motion sensor of the second hearing instrument, and/or wherein a distance between the first hearing instrument and the second hearing instrument is estimated or ascertained by a communication system of the two hearing instruments, and it is identified on the basis of the first motion signal and the second motion signal and/or on the basis of the ascertained distance, whether the two hearing instruments are each being worn in their intended position on respective ears of a user.

The subject matter of the dependent claims and of the description below contains advantageous embodiments, some of which are inventive in their own right.

A hearing instrument in this case generally encompasses any apparatus that is configured to produce a sound signal from an electrical signal—which can also be an internal signal of the apparatus—and to feed the sound signal to an ear of a wearer of this apparatus, so in particular headphones (e.g. as an "earbud"), a headset, smart glasses containing a loudspeaker, etc. A hearing instrument also encompasses a hearing aid in the narrower sense, however, i.e. a device for treating a hearing impairment of the wearer, in which device an input signal produced from an ambient signal by a microphone is processed into an output signal and amplified in the process, in particular according to frequency band, and an output sound signal produced from the output signal by a loudspeaker or the like is suitable for correcting, at least partially, the hearing impairment of the user, in particular in a user-specific manner.

In the binaural hearing system, the wearer is meant to wear the first and second hearing instruments each on a different ear, so for instance the first hearing instrument on the left ear and the second hearing instrument on the right ear. The wearing as intended of the binaural hearing system encompasses in particular the wearing of the two hearing instruments on the respective ears in the designated, including model-dependent, wearing position.

In the case of behind-the ear (BTE) hearing aids as the hearing instruments, this includes, for example, positioning each hooked housing (earhook) behind the ear and inserting the earpiece into the concha or the entrance to the auditory canal. In the case of headphones in the form of earplugs, but also in the case of in-the-ear (ITE) hearing aids, this includes positioning each housing in the concha.

The first and second motion sensors are both in particular accelerometers. In particular, an acceleration with respect to gravity can be determined from the first motion signal at least given a relatively long time average in the range of 0.2 s to 2 s and preferably up to 5 s and/or by using low-pass filtering, from which acceleration can also be ascertained an absolute pitch angle with respect to gravity.

The communication system of the two hearing instruments includes a first transmission unit in the first hearing instrument and a second transmission unit in the second hearing instrument, wherein the first and second transmission units are each configured to send transmission signals to the other transmission unit in each case, and to receive transmission signals from the other transmission unit in each case. The transmission units preferably each have for this purpose at least one appropriately configured antenna for emitting and receiving electromagnetic waves and/or magnetic fields. The transmission signals can be transmitted in particular in the RF and/or microwave and/or infrared region and/or as near field magnetic induction (NFMI). In particular, standardized protocols such as Bluetooth, for example, can be used for the transmission of the transmission signals. A proprietary protocol, in particular developed specifically for this application, can also be used, however, for the transmission of the transmission signals.

The invention uses the fact that when a binaural hearing system is being worn as intended as described above, it has a fixed spatial relationship between the two hearing instruments. This spatial relationship includes a constant distance between each one, known in advance for the particular wearer, and also that the absolute roll angles and pitch angles of the two hearing instruments are correlated with each other and, in the ideal case, are identical to each other. Moreover, the changes in the stated angles (i.e. movements of the hearing instruments) are also correlated with each other.

While the aforementioned mutual angular relationships of the two hearing instruments can be determined from the respective motion signals, the distance between the two hearing instruments can be ascertained by using the communication system, for which purpose can be used in particular a transmission quality of a transmission signal. An estimate or measurement of the transmission quality is often already provided between both transmission units of the communication system as a function, and therefore no additional overhead is created in this case for estimating the distance because a correlation of the transmission quality with the distance can be exploited.

Preferably, a first roll angle and/or a first pitch angle of the first hearing instrument is ascertained from the first motion signal, wherein a second roll angle and/or a second pitch angle of the second hearing instrument is ascertained from the second motion signal, and wherein the wearing as intended is ascertained on the basis of the first and second roll angles and the first and second pitch angles respectively. FIG. 1 illustrates the associated angular relationships.

FIG. 1 shows schematically in an oblique view a human head 1 with the three associated body axes AS', AL and AT', where AL forms the longitudinal axis of the body, and AS' and AT' the offsets of the sagittal axis and transverse axis respectively so that the offset axes AS', AT' intersect approximately in the center of the head 1. A movement R about the offset sagittal axis AS' describes a corresponding roll angle αR, a movement N about the offset transverse axis AT' describes a pitch angle αN, and a movement G about the longitudinal axis AL describes a yaw angle αG. The stated angles can be assigned accordingly to the two hearing instruments by using for the definition of a yaw, pitch and roll angle of a hearing instrument the angle that the hearing instrument describes during a head movement by the corresponding angles.

In particular, a difference is then formed between the first and second roll angles and/or between the first and second pitch angles, and the wearing as intended is ascertained on the basis of the difference in the roll angles and the difference in the pitch angles, respectively.

In the ideal case, the difference between the two roll angles and the difference between the two pitch angles should equal zero during wearing as intended. Since, however, minimum imprecision in fitting a hearing instrument and even small anatomical asymmetries (for instance pinna that differ minimally in size) result in the differences potentially retaining non-zero values, even during wearing as intended, the respective differences are preferably compared with a limit value that can be selected to be sufficiently low (for example 20°, preferably 10°, particularly preferably) 5°, and in particular continuously or persistently being below the limit value is assessed as a possible indicator of wearing as intended.

Advantageously, the first roll angle and/or the first pitch angle is compared with a reference roll angle and a reference pitch angle respectively, and the wearing as intended is also ascertained on the basis of the comparison of the first roll angle and/or the first pitch angle with the reference roll angle and the reference pitch angle respectively. This uses the fact that for a normal, i.e. substantially upright, head posture, each of the hearing instruments adopts a certain positioning with respect to the longitudinal axis (and hence also with respect to gravity). Thus preferably, the roll angle and the pitch angle in a wearing position designated for the wearing as intended are used as the reference roll angle and the reference pitch angle respectively. This positioning can depend in particular on the configuration of the hearing instrument concerned (i.e. BTE or ITE) and/or on anatomical characteristics of the wearer (for instance the shape of the pinna or of the concha). In particular, for this purpose, the respective reference roll angles and/or pitch angles can be custom-measured for the wearer in advance.

Preferably, in the comparison of the first and second roll angle/pitch angle respectively with the associated reference value, a difference (i.e. a difference angle) is formed, and this is compared with a preset limit value (for example 20°, preferably 10°, particularly preferably) 5°. In particular, continuously or persistently being below the limit value can then be assessed as a possible indicator of wearing as intended.

Advantageously, for the determining of the first and/or second roll angle and/or the first and/or second pitch angle, an average value is formed over a suitable time window of at least 0.2 s in length, and preferably at least 0.5 s in length, or signal components of the first and second motion signal respectively are used for which the angle concerned is sufficiently stationary over a defined time window of at least 0.2 s and preferably at least 0.5 s in length. The stationarity can be ascertained in this case suitably by using a corresponding measure (e.g. sliding standard deviation over the traveling time window and comparison with a correspondingly defined limit value).

It also proves advantageous if a change in the first roll angle and/or in the first pitch angle is ascertained from the first motion signal, wherein a change in the second roll angle and/or in the second pitch angle is ascertained from the second motion signal, and wherein the wearing as intended is ascertained from a difference and/or a correlation in the changes in the first roll angle and second roll angle and in the first pitch angle and second pitch angle respectively. This uses the fact that the changes in the stated angles, which correspond to respective movements of the associated hearing instrument, occur in a correlated manner during the wearing as intended because both hearing instruments are affected by the movement and hence by the change in the angle concerned.

The difference in the change preferably lies below a suitably defined limit value in order to be assessed as a possible indicator of wearing as intended. The correlation is preferably ascertained by using a suitable correlation measure (e.g. cross-correlation) and preferably lies above a suitably defined limit value in order to be assessed as a possible indicator of wearing as intended.

In a further advantageous embodiment, at least one quantitative measure of a signal quality of a transmission signal by the communication system is ascertained, wherein the distance between the first hearing instrument and the second hearing instrument is estimated or ascertained on the basis of the measure of the signal quality.

The quantitative measure is preferably ascertained as a bit error rate (BER) of a defined data packet and/or a bit error rate of a randomized data packet and/or an error vector magnitude and/or a correlation with a defined signal content. A synchronization sequence (known as a "pilot sequence") can be used in this case as the defined data packet. The synchronization sequence is used to synchronize the data transmission in numerous protocols, and the content of which is known to both the sender and the recipient. The BER can be estimated appropriately from the synchronization sequence. It is also possible to use a data packet randomized on the basis of a shared "seed" by using a pseudorandom number generator (BER). An error vector magnitude (EVM) can be ascertained in particular in a transmission by using phase shift keying or quadrature phase shift keying (PSK or QPSK) on the basis of an ascertained error vector of the received signal in relation to the ideal signal points. The quantities have a high correlation with the distance and are therefore particularly suitable for estimating or measuring same.

Advantageously, the transmission signal is transmitted by using NFMI between a first transmission unit of the communication system, which transmission unit is located in the first hearing instrument, and a second transmission unit of the communication system, which transmission unit is located in the second hearing instrument. NFMI has practically negligible absorption in human body tissue and is therefore particularly suitable for a transmission in a binaural hearing system.

Expediently, the second motion signal is transmitted from the second hearing instrument to the first hearing instrument, and the wearing as intended of the binaural hearing system is ascertained in the first hearing instrument on the basis of the first motion signal and on the basis of the second motion signal. The wearing as intended can thereby be identified locally in the first hearing instrument.

With the objects of the invention in view, there is concomitantly provided a binaural hearing system having a first hearing instrument and a second hearing instrument, wherein the binaural hearing system is configured to perform the above-described method. Preferably, in the binaural hearing system, the first hearing instrument and/or the second hearing instrument is provided as a behind-the-ear hearing aid.

The binaural hearing system according to the invention shares the advantages of the method according to the invention. The advantages stated for the method and its developments can be applied mutatis mutandis to the binaural hearing system and its developments, and vice versa.

Other features which are considered as characteristic for the invention are set forth in the appended claims.

Although the invention is illustrated and described herein as embodied in a method for ascertaining the wearing as intended of a binaural hearing system, and a binaural hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
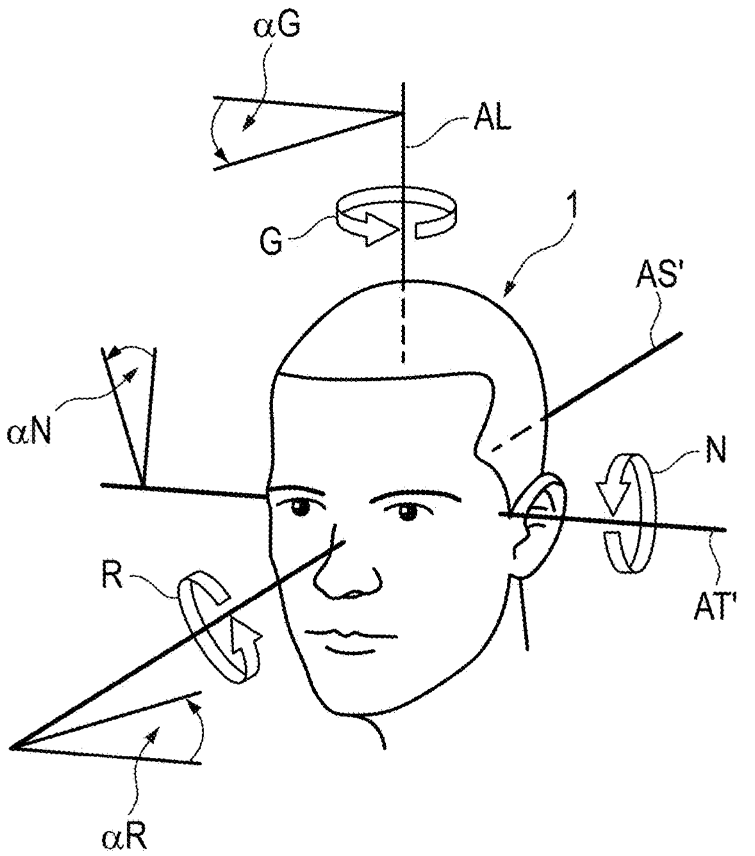
FIG. 1 is a schematic, oblique view of a head and rotations about various of its axes.
Figure 2:
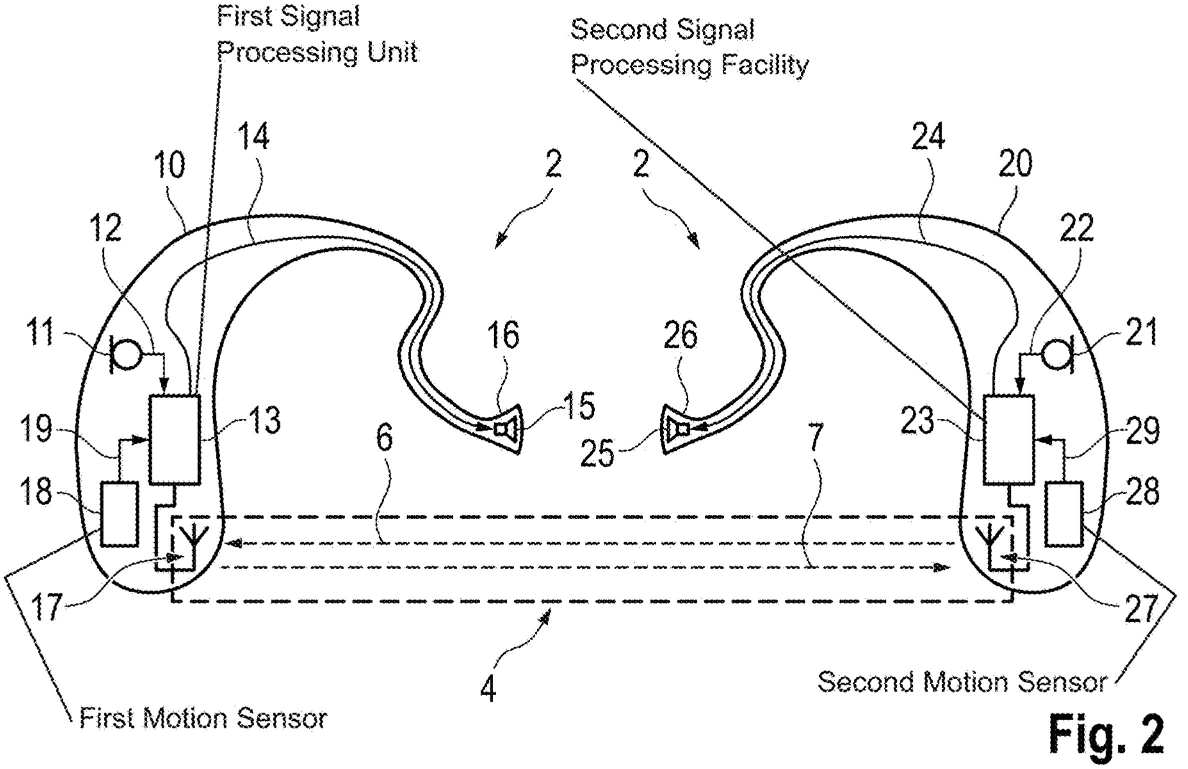
FIG. 2 is a diagrammatic, side-elevational view and block diagram of a binaural hearing system having two hearing instruments.

Referring now in detail to the figures of the drawings, in which corresponding parts and variables are denoted by the same reference signs, and first, particularly, to FIG. 2 thereof, there is seen a diagrammatic side-elevational view and block diagram of a binaural hearing system 2 having a first hearing instrument 10 and a second hearing instrument 20, each in the form of a BTE device. The first hearing instrument 10 has an electro-acoustic first input transducer 11, which in this case is in the form of a microphone and is configured to produce from ambient sound (not presented in further detail) an electrical first input signal 12, the variations in current and/or voltage of which largely represent the variations in the air sound pressure. The first hearing instrument 10 additionally has a first signal processing unit 13, which is configured to produce, by using in particular customized user-specific signal processing, an electrical first output signal 14 from the first input signal 12 and, if applicable, from a transmission audio signal 6 received from the second hearing instrument 20. The transmission audio signal 6 can be constituted in particular by a second input signal 22 or a signal derived therefrom. The output signal 14 is converted during operation of the first hearing instrument 10 by an electro-acoustic first output transducer 15 into an output sound signal (not presented in further detail), which is output via the first earpiece 16 into the auditory canal of that ear of the user on which the hearing instrument 10 is being worn.

The first output transducer 15 can be constituted in this case in particular by a loudspeaker. The first hearing instrument 10 can also have a bone conduction receiver or the like, however. The first hearing instrument 10 can also have in particular further input transducers (not shown) that produce additional input signals from the ambient sound for in particular directional signal processing in the first signal processing unit 13.

The binaural hearing system 2 moreover has a communication system 4 for the transmission of the transmission audio signal. The communication system 4 has a first transmission facility 17 in the first hearing instrument 10 and a second transmission facility 27 in the second hearing instrument 20. The first hearing instrument 10 also has a first motion sensor 18, which in this case is in the form of an accelerometer and is configured to produce a first motion signal 19 on the basis of movements. The first motion signal 19 can have in particular a multi-channel configuration, for instance in order to be able to resolve accelerations and/or movements into the three spatial directions.

The second hearing instrument 20 is substantially identical in configuration (or mirror symmetrical in shape) to the first hearing instrument 10, and includes a second input transducer 21 for producing the second input signal 22, a second signal processing facility 23 for producing a second output signal 24, and also a second output transducer 25 for reproducing same, and a second earpiece 26. In addition, the second hearing instrument 20 includes the second transmission unit 27 and a second motion sensor 28 for producing a second motion signal 29.

When the binaural hearing system 2 is being worn as intended, i.e. when the first hearing instrument 10 is being worn on one ear of the wearer (for instance on the left ear) in the designated wearing position, and the second hearing instrument 20 is being worn on the other ear of the wearer (for instance the right ear) in the appropriately designated wearing position, it is the case that the two hearing instruments 10, 20 have precisely defined positional relationships to one another. Even during movement of the head of the wearer (for instance when the wearer lowers his or her head or tilts it sideways), this movement or an associated change in position is performed by both hearing instruments 10, 20. It is also the case that the two hearing instruments 10, 20 have a precisely defined distance between each other given by the size (strictly speaking the width) of the head of the wearer. This can be used to detect wearing of the binaural hearing system 2, which shall be described later.

In particular, the first and second motion signals 19, 29 are used for this purpose. For local processing, for example of the two motion signals 19, 29 in the first hearing instrument 10, the second motion signal 29 or a signal (not shown) derived therefrom by preprocessing can be transmitted by using the communication system 4 from the second hearing instrument 20 to the first hearing instrument 10. The processing for ascertaining the respective positional relationships of the hearing instruments 10, 20 can be performed in particular in the first signal processing facility 13, which in this case is in the form of an apparatus for general signal processing (i.e. not only for processing audio signals) and is equipped with appropriate signal processors.

Figure 3:
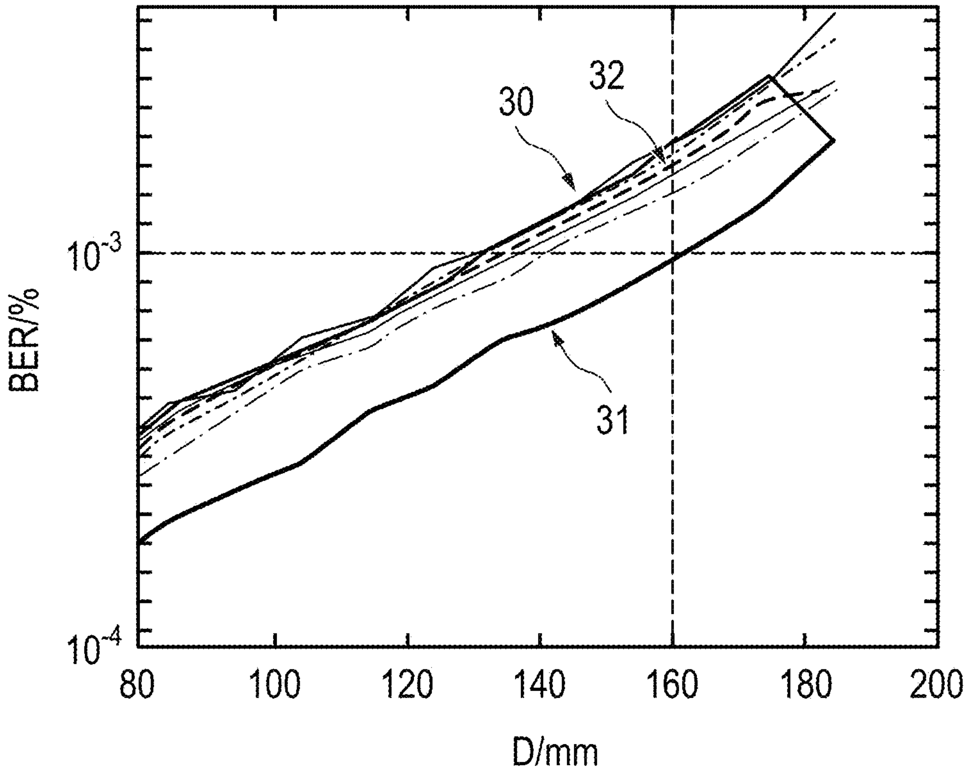
FIG. 3 is a graph showing the relationship between distance between the two hearing instruments of FIG. 2 and the BER of a transmission signal therebetween.

For ascertaining the distance between the two hearing instruments 10, 20, a generic transmission signal 7 can be sent by using the communication system 4 from the first transmission unit 17 to the second transmission unit 27 (or vice versa), and a characteristic value of the signal quality, for instance the BER or the EVM, can be measured. This is shown for the BER using FIG. 3, in which actual BER measurements 30 of a plurality of different binaural hearing systems of the same configuration are plotted against the distance D between the hearing instruments in each case. The decreasing transmission power with distance D means that individual bit errors occur as a result of thermal noise in an input amplifier of the receiving hearing instrument 10, 20. With the exception of an outlier 31, the other BER measurements 30 have a very similar curve, so that, for example, their median 32 (dashed line; to eliminate the values of outliers) can be used as a calibration (for instance in a table) for a distance measurement of the hearing instruments.

Figure 4:
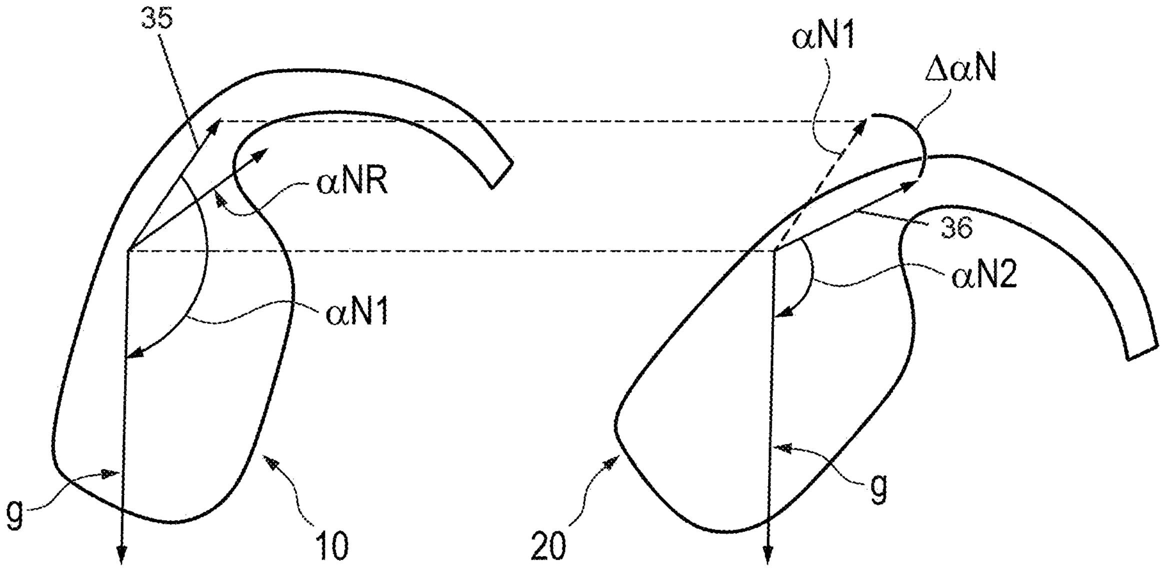
FIG. 4 is a side-elevational view showing the pitch angles of the two hearing instruments of FIG. 2.

FIG. 4 shows diagrammatically in a side view the first hearing instrument 10 and the second hearing instrument 20 of FIG. 2. The first hearing instrument 10 has a first main axis 35 forming a first pitch angle αN1 with respect to the direction of gravity g, which pitch angle has a value of 148° in this case. The second hearing instrument 20 has a second main axis 36 forming a second pitch angle αN2 with respect to the direction of gravity g, which pitch angle has a value of 122° (no angles shown to scale). The difference ΔαN in the two pitch angles αN1, αN2 thus equals 26°. This is too high a value to be regarded as an indicator for the wearing as intended of the two hearing instruments 10, 20.

In addition, a reference pitch angle αNR is also shown in FIG. 4 for the first hearing instrument. This reference pitch angle αNR corresponds to an angle that equals the first pitch angle αN1 (i.e. which the first main axis 35 forms with respect to the direction of gravity g) when the first hearing instrument 10 is being worn as designated on the ear, and the wearer also has an upright body and head posture. The first pitch angle αN1 forms a difference ΔαN of 18° with the reference pitch angle NR in this case. This value is also too high to be regarded as an indicator for the wearing as intended of the first hearing instrument 10. A similar comparison of the second pitch angle αN2 with the reference pitch angle αNR is likewise possible.

Figure 5:
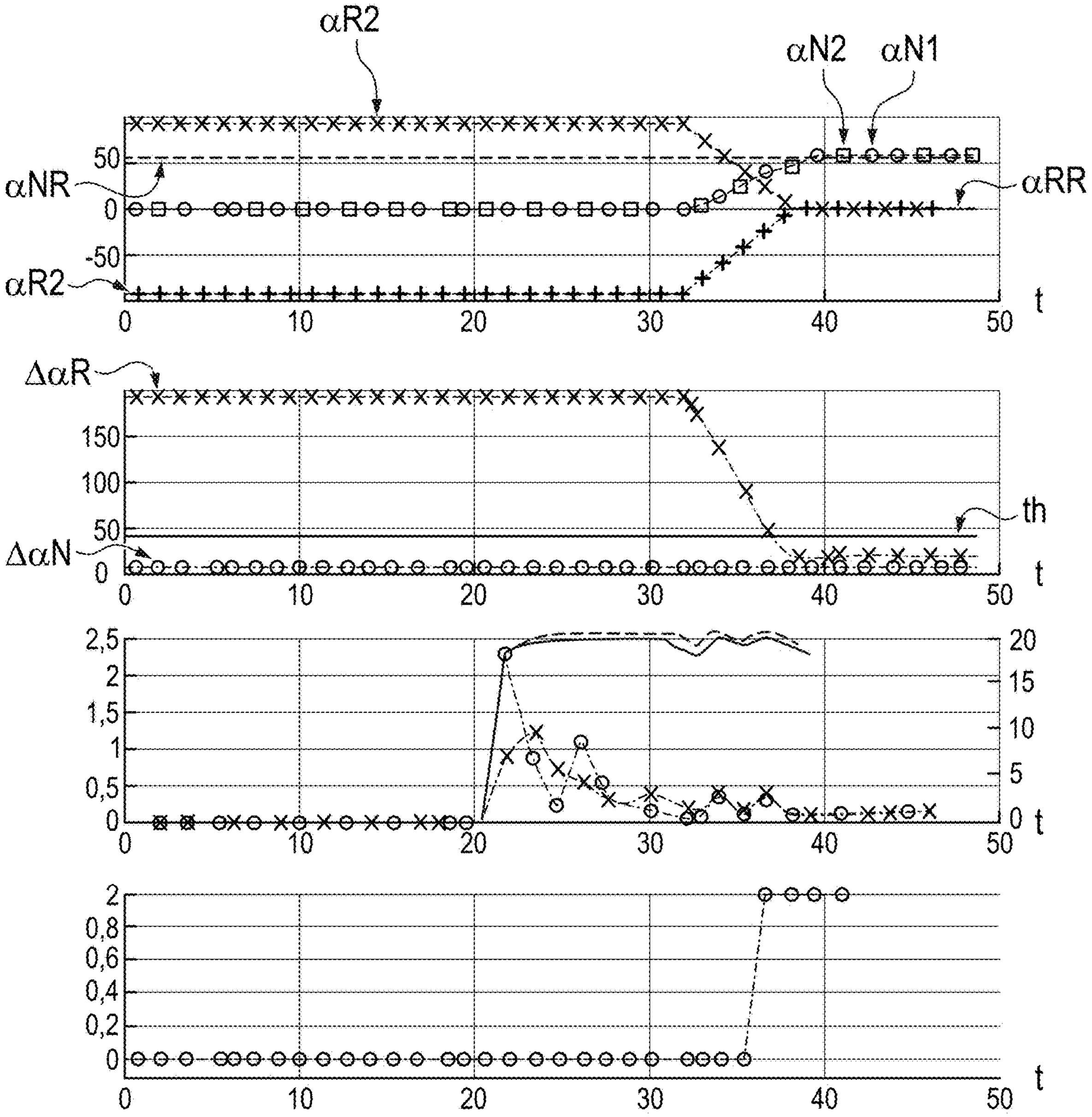
FIG. 5 includes four timing diagrams used for identification of the wearing as intended for the binaural hearing system 2 of FIG. 2.

FIG. 5 graphically uses four timing diagrams to show a decision routine in a method for identifying the wearing as intended for the binaural hearing system 2 of FIG. 2. The top timing diagram of FIG. 5 shows, for the first hearing instrument 10, the values of the first pitch angle αN1 (symbol "○") and of the first roll angle αR1 (symbol "+"), in each case measured by the first motion sensor 18, and shows for the second hearing instrument 20 the values of the second pitch angle N2 (symbol "□") and of the second roll angle αR2 (symbol "x"), in each case measured by the second motion sensor 28, against a time axis t (in seconds). In addition, the reference pitch angle αNR (dashed line) and the reference roll angle αRR (continuous line) are plotted. The angles used in FIG. 5 are all shown as complementary angles to the angles of FIG. 4 (i.e. 180°−corresponding angle from FIG. 4).

The reference pitch angle αNR thus equals 50, which takes account of the fact that when being worn as intended, the respective hearing instruments 10, 20 in terms of the main direction 35, 36 are appreciably tilted with respect to gravity g (see the first hearing instrument 10 in FIG. 4). The reference roll angle αRR equals 0°, because each of the hearing instruments 10, 20 is worn with its housing parallel to the associated side of the head.

As is evident in the top diagram, the two hearing instruments 10, 20 remain slightly longer than 30 seconds in positions that each have a correct pitch angle αN1=αN2=0° and opposite roll angle αR1=−αR2 of nearly 90°. It can be inferred from the roll angles αR1, αR2 that the hearing instruments 10, 20 are each lying on their sides. At approximately 32 seconds, the two hearing instruments 10, 20, as evidenced by their roll angles αR1, αR2, are each brought into the upright position corresponding to the reference roll angle RR, which they adopt at approximately 40 seconds.

Roughly the same time curve arises for the pitch angles αN1, αN2. The hearing instruments 10, 20 are tilted slightly at a time of about 32 seconds onwards, resulting in each adopting the reference pitch angle αNR at about 40 second onwards. Once the reference pitch angle αNR and reference roll angle αRR are adopted by the associated angles of the respective hearing instruments 10, 20, this can be assessed in each case to be an indicator of the wearing as intended of the hearing instrument 10, 20 and hence in particular of the binaural hearing system 2 (but not significantly before).

The second diagram shows the difference ΔαN in the pitch angles (symbol "○") and the difference ΔαR in the roll angles (symbol "x") and an associated threshold value th. Based on the data from the top diagram, the difference ΔαN in the pitch angles is always almost zero, even when the pitch angles αN1, αN2 themselves undergo a change (between 32 and 40 seconds). This could be used a priori as a positive indicator of the wearing as intended because the difference ΔαN in the pitch angles is constantly below the threshold value th. Until 36 seconds, however, the difference ΔαR in the roll angles exceeds the threshold value th, and therefore in this case there is no such indicator until the difference ΔαR in the roll angles goes below the threshold value th (at about 36 seconds onwards).

In the third diagram, the L1-norms of the Cartesian movements (symbols "x" and "○" respectively for the first and second hearing instruments 10, 20) and identified movement intensities (continuous and dashed lines) are plotted for each hearing instrument 10, 20. A movement is assumed in this case if the associated L1-norm exceeds the value 1 in the last 10 seconds. It is evident that the movement of both hearing instruments 10, 20 starts already at about 20 seconds, and thus significantly before the hearing instruments 10, 20 are first brought into the upright position (at 32 seconds onwards), and then brought into the correct wearing position (at about 40 seconds onwards, see pitch angles αN1, αN2 in the top diagram and their difference ΔαN in the second diagram). It can be inferred therefrom that the wearer picks up the hearing instruments 10, 20 at about 20 seconds (and possibly takes them out of a charging station or the like in which the hearing instruments 10, 20 have a well-defined position), in order to fit them. In order to do this, he or she brings the hearing instruments 10, 20 into the upright position at about 32 seconds onwards, and at 40 seconds into the correct inclination of the respective pitch angles αN1, αN2.

The bottom diagram of FIG. 5 describes the identification of the wearing as intended of the binaural hearing system 2 of FIG. 2 resulting from the three diagrams described above. Only once such wearing is suggested by all possible indicators in the top diagrams is the binary value (symbol "○") accordingly set from zero to one and the wearing affirmed. This happens at about 36 seconds, i.e. at the time at which the difference ΔαR in the roll angles goes below the threshold value th, and the individual roll angles and pitch angles αR1, αR2, αN1, αN2 have gotten sufficiently close to their associated reference angles (αRR, αNR).

In particular, it is also possible to use in this case as an additional indicator a distance measurement, performed as described above.

Although the invention has been illustrated and described in detail using the preferred exemplary embodiment, the invention is not limited by the disclosed examples, and a person skilled in the art can derive other variations therefrom without departing from the scope of protection of the invention.

The following is a summary list of reference numerals and the corresponding structure used in the above description of the invention:

1 head
2 binaural hearing system
4 communication system
6 transmission audio signal
7 (generic) transmission signal
10/20 first/second hearing instrument
11/21 first/second input transducer
12/22 first/second input signal
13/23 first/second signal processing unit
14/24 first/second output signal
15/25 first/second output transducer
16/26 first/second earpiece
17/27 first/second transmission unit
18/28 first/second motion sensor
19/29 first/second motion signal
30 BER measurement
31 outlier
32 median
35 first main axis
36 second main axis
AS' offset sagittal axis
AL longitudinal axis
AT' offset transverse axis
D distance
G movement (about longitudinal axis)
N movement (about offset transverse axis)
R movement (about offset sagittal axis)
th threshold value
αG yaw angle
αN pitch angle
αN1/αN2 first/second pitch angle
αNR reference pitch angle
αR roll angle
αR1/αR2 first/second roll angle
αRR reference roll angle
ΔαN difference in the pitch angles
ΔαR difference in the roll angles

The invention claimed is:

1. A method for ascertaining the wearing as intended of a binaural hearing system having a first hearing instrument and a second hearing instrument, the method comprising:

at least one of:

using a first motion sensor of the first hearing instrument to capture a first motion signal, and using a second motion sensor of the second hearing instrument to capture a second motion signal, or using a communication system of the first and second hearing instruments to estimate or ascertain a distance between the first hearing instrument and the second hearing instrument; and identifying, based on at least one of the first motion signal and the second motion signal or the ascertained distance, whether the first and second hearing instruments are each being worn in their intended position on respective ears of a user.

2. The method according to claim 1, which further comprises:

ascertaining at least one of a first roll angle or a first pitch angle of the first hearing instrument from the first motion signal;

ascertaining at least one of a second roll angle or a second pitch angle of the second hearing instrument from the second motion signal; and ascertaining the wearing as intended based on at least one of the first and second roll angles or the first and second pitch angles.

3. The method according to claim 2, which further comprises:

forming at least one of a difference between the first and second roll angles or a difference between the first and second pitch angles; and ascertaining the wearing as intended based on the respective difference between the roll angles and difference between the pitch angles.

4. The method according to claim 2, which further comprises:

respectively comparing the first roll angle and the first pitch angle with a reference roll angle and a reference pitch angle; and also ascertaining the wearing as intended based on the respective comparison of the first roll angle or the first pitch angle with the reference roll angle and the reference pitch angle.

5. The method according to claim 4, which further comprises respectively using the roll angle and the pitch angle in a wearing position designated for the wearing as intended as the reference roll angle and the reference pitch angle.

6. The method according to claim 2, which further comprises:

determining at least one of the first or second roll angle or the first or second pitch angle, by at least one of:

forming an average value over a suitable time window of at least 0.2 s in length, or using only respective signal components of the first and second motion signals for which the angle concerned is sufficiently stationary over a defined time window of at least 0.2 s.

7. The method according to claim 2, which further comprises:

ascertaining a change in at least one of the first roll angle or the first pitch angle from the first motion signal;

ascertaining a change in at least one of the second roll angle or the second pitch angle from the second motion signal; and ascertaining the wearing as intended from at least one of a respective difference or a correlation in the changes in the first roll angle and second roll angle and in the changes in the first pitch angle and second pitch angle.

8. The method according to claim 1, which further comprises:

ascertaining at least one quantitative measure of a signal quality of a transmission signal by the communication system; and estimating or ascertaining the distance between the first hearing instrument and the second hearing instrument based on the measure of the signal quality.

9. The method according to claim 8, which further comprises ascertaining, as the quantitative measure, at least one of a bit error rate of a defined data packet or a bit error rate of a randomized data packet or an error vector magnitude or a correlation with a defined signal content.

10. The method according to claim 8, which further comprises transmitting the transmission signal by using near field induction between a first transmission unit of the communication system, the first transmission unit being located in the first hearing instrument, and a second transmission unit of the communication system, the second transmission unit being located in the second hearing instrument.

11. The method according to claim 1, which further comprises:

transmitting the second motion signal from the second hearing instrument to the first hearing instrument; and ascertaining the wearing as intended of the binaural hearing system in the first hearing instrument based on the first motion signal and based on the second motion signal.

12. A binaural hearing system, comprising:

a first hearing instrument and a second hearing instrument;

the binaural hearing system configured to perform the method according to claim 1.

* * * * *